United States Patent Office 2,944,049
Patented July 5, 1960

2,944,049
POLYMERIZATION OF OLEFINS IN HALOGEN-CONTAINING DILUENT

James T. Edmonds, Jr., Bartlesville, Okla., assignor to Phillips Petroleum Company, a corporation of Delaware No Drawing. Filed Nov. 25, 1957, Ser. No. 698,371

3 Claims. (Cl. 260—94.9)

This invention relates to the polymerization of olefins. In one aspect, the invention relates to a method for polymerizing olefins in the presence of a halogen-containing diluent. In another aspect, the invention relates to a novel catalyst for use in the polymerization of olefins in the presence of a halogen-containing diluent.

Reactions for polymerizing olefins are well known in the art and are generally carried out in the presence of catalysts. One class of catalysts which has been used in the polymerization of monoolefins, particularly ethylene, is organometal compounds, for example, triethylaluminum, and the polymers which have been obtained in accordance with this method are generally liquid or low molecular weight solid polymers. It has been recently discovered, as disclosed in the copending U.S. patent application of J. P. Hogan and R. L. Banks, Serial No. 573,877, filed March 26, 1956, now issued as U.S. Patent 2,825,721, that unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria. When the above-described processes are carried out in the liquid phase, a hydrocarbon diluent, inert and liquid under conditions of the process, is used. In accordance with the instant invention, a novel catalyst composition is provided which is effective in polymerizing olefins to solid polymers in the presence of halogen-containing diluents.

It is an object of the invention, therefore, to provide a novel process for polymerizing olefins in the presence of a halogen-containing diluent.

Another object of the invention is to provide a novel catalyst for use in polymerizing olefins in the presence of a halogen-containing diluent.

Other and further objects and advantages of the invention will become apparent to those skilled in the art upon consideration of the accompanying disclosure.

The present invention resides in the discovery that a solid polymer is obtained when an olefin, such as ethylene, is contacted in the presence of a halogen-containing diluent with a catalyst composition comprising (1) an oxide of chromium, said oxide containing a substantial amount of metal in the hexavalent state and being associated with at least one additional oxide selected from the group consisting of silica, alumina, thoria, and zirconia, and (2) at least one compound selected from the group consisting of (a) compounds corresponding to the formula $MR_n$, wherein M is a metal selected from the group consisting of boron, aluminum, gallium, indium, thallium, zinc, beryllium and magnesium, wherein R is at least one member selected from the group consisting of saturated acyclic hydrocarbon radicals, saturated cyclic hydrocarbon radicals, and aromatic hydrocarbon radicals, and wherein n is equal to the valence of metal M, and (b) an organometal halide corresponding to the formula $R_xMX_y$, wherein R and M are as indicated hereinbefore, X is a halogen, including chlorine, bromine, fluorine and iodine, and wherein $x$ and $y$ are integers, the sum of $x$ and $y$ being equal to the valence of metal M.

The chromium oxide-containing component of my catalyst system can be prepared by preparation methods which are known in the art, e.g., direct mixing of solid components, impregnation, etc. In order to obtain optimum activity, it is preferred that the component comprising chromium oxide and the additional oxide as hereinbefore specified be heated under elevated temperature and for a sufficient time to activate, or increase the activity of, the component for the polymerization reaction. It is also preferred that the catalyst component comprising chromium oxide and the additional oxide be heated under non-reducing conditions in an atmosphere such as oxygen, air, nitrogen, carbon dioxide, helium, argon, krypton, or xenon. Reducing gases such as hydrogen or carbon monoxide can be present in the atmosphere where the time of contact, especially at the higher temperatures, is limited to prevent extensive reduction of the hexavalent chromium; however, the presence of such gases, and of reducing agents in general, is ordinarily not desired. It is usually preferred that the activation atmosphere be non-reducing. It is further preferred that the atmosphere be positively oxidizing, e.g., air or oxygen. The temperature and time of activation can vary over wide ranges and are closely inter-related (so-called "time-temperature effect"), longer times being required at lower temperatures and shorter times at higher temperatures. Catalyst components prepared by milling solid silica-alumina, zirconia and/or thoria with solid chromium oxide are activatable at lower temperatures than are catalyst components prepared by impregnating silica, alumina, zirconia and/or thoria with an aqueous solution of a chromium compound. As a practical matter, a chromium oxide catalyst component prepared by dry mixing is ordinarily activated at a temperature of at least about 350° F. and not substantially greater than about 1500° F. A component prepared by impregnation with an aqueous solution is ordinarily activated at a temperature of at least 450° F. and not substantially greater than 1500° F. Times of activation can range from about a second at the highest temperatures to 50 hours or more at the lowest temperatures. The stated numerical values are given as illustrative of the most practical ranges and are not absolute limits. By using very short times and higher temperatures, or very long times and lower temperatures, catalyst components having various degrees of increased activation are obtainable.

The chromium oxide catalyst component can be prepared by impregnation of particulate silica, alumina or silica-alumina, for example, with a solution of chromium trioxide or a compound convertible to chromium oxide by calcination, followed by drying and activation of the composite at a temperature in the range of 450 to 1500° F., preferably 750 to 1500° F., for a period of from 3 to 10 hours or more. Activation is conducted by heating in a stream of gas. It is preferred that the gas contain oxygen and be substantially water-free. Preferably, the dew point of the activation gas should be below 75° F., more desirably below zero. However, inert gases, such as carbon dioxide and nitrogen can be used. The catalyst component comprising chromium oxide can be prepared using, as a starting material, chromium trioxide, chromic nitrate, chromic acetate, chromic chloride, chromic sulfate, ammonium chromate, ammonium dichromate, sodium dichromate, lithium chromate, or other soluble salts of chromium. Impregnation with chromium trioxide is preferred, although the chromium nitrates can be used with similar results. The amount of chromium, as chromium oxide, in the catalyst component can range from 0.1 to 10 or more weight percent, and is ordinarily a minor component of the catalyst component in terms of weight percent. A preferred non-chromium component or "support" is a silica-alumina composite containing a major proportion of silica and a minor proportion of alumina. While the method of preparing the silica-alumina composite undoubtedly affects the catalyst activity to some extent, it appears that silica-alumina composites prepared by any of the prior art processes for preparing such catalytically active composites are operative for the process of this invention. Coprecipitation and impregnation are examples of such processes. One support that has been found particularly effective is a coprecipitated 90 percent silica-10 percent alumina support. It is necessary for some of the chromium to be in the hexavalent state, and it is preferred to use a chromium oxide catalyst component in which the amount of hexavalent chromium is at least 0.1 percent of the weight of the catalyst component comprising the chromium oxide and associated oxide or oxides. The hexavalent chromium is determined by ascertaining the water soluble chromium present by leaching with water and determining the dissolved chromium in the leachings by any suitable analytical method known in the art, e.g., addition of potassium iodide solution and titration of the liberated iodine with sodium thiosulfate solution.

In admixture with the chromium oxide component described above, my novel catalyst system comprises a compound corresponding to the formula $MR_n$ wherein M is one of the metals boron, aluminum, gallium, indium, thallium, zinc, beryllium, or magnesium, and R is a saturated acyclic hydrocarbon radical, a saturated cyclic hydrocarbon radical, or an aromatic hydrocarbon radical or any combination thereof, and wherein $n$ is equal to the valence of the metal. Examples of compounds corresponding to the formula $MR_n$ which can be used are $B(CH_3)_3$, $B(C_2H_5)_3$, $Al(CH_3)_3$, $Al(C_2H_5)_3$, $Al(C_3H_7)_3$, $Al(C_4H_9)_3$, $Al(C_6H_5)_3$, $Al(C_6H_{13})_3$, $Al(C_8H_{17})_3$, $Al(C_{20}H_{41})_3$, $Ga(C_2H_5)_3$, $Ga(C_3H_7)_3$, $In(CH_3)_3$, $In(C_6H_{13})_3$, $In(C_6H_5)_3$, $In(C_6H_{11})_3$, $Th(CH_3)_3$, $Th(C_4H_9)_3$, $Be(CH_3)_2$, $Be(C_6H_5)_2$, $Zn(C_2H_5)_2$, $Zn(C_3H_7)_2$, $Zn(C_6H_5)_2$, $Mg(C_2H_5)_2$, $Mg(C_6H_5)_2$, $Mg(C_4H_9)_2$, and the like.

Alternatively, or in addition to the $MR_n$ compounds set forth above, my catalyst system comprises a mixture of the above-described chromium oxide catalyst component and at least one organometal halide corresponding to the formula $R_xMX_y$, wherein M and R are as described hereinbefore with relation to the $MR_n$ compounds, and wherein X is a halogen. The $x$ and $y$ are integers, and the sum of $x$ and $y$ is equal to the valence of the metal M. X can be any of the halogens, including chlorine, bromine, iodine, and fluorine. The saturated acyclic hydrocarbon radicals, saturated cyclic hydrocarbon radicals and aromatic hydrocarbon radicals, which can be substituted for R in either the $MR_n$ or $R_xMX_y$ formulas, include hydrocarbon radicals having up to about 20 carbon atoms each. Radicals having 10 carbon atoms or less are preferred since the resulting catalyst composition has a greater activity for initiating the polymerization of olefins. Mixtures of one or more organometal halide components, such as a mixture of ethylaluminum dichloride and diethylaluminum chloride, can be used in my catalyst composition. Specific examples of other organometal halides which are useful in the catalyst composition of this invention are the following: $CH_3BCl_2$, $C_2H_5BCl_2$, $C_8H_{17}BBr_2$, $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)GaF$, $(C_6H_{11})_2GaCl$ (cyclohexane derivative), $C_6H_5GaBr_2$ (benzene derivative), $C_{20}H_{41}GaBr_2$, $(C_{14}H_{29})_2GaF$, $(C_6H_6)_2InCl$ (benzene derivative), $C_8H_{17}InF_2$, $C_6H_{11}InBr_2$ (cyclohexane derivative), $C_{17}H_{35}BeI$, $CH_3BeBr$, $C_3H_7ZnCl$, $C_4H_9ZnI$, $C_2H_5MgCl$, $C_8H_{17}MgBr$, and the like.

The olefins which are polymerized in accordance with the process of this invention are preferably aliphatic 1-olefins having up to and including 8 carbon atoms per molecule. Examples of such olefins which can be used include ethylene, propylene, 1-hexene, and 1-octene. It is also within the scope of the invention to utilize the instant catalyst system to prepare copolymers of aliphatic 1-olefins and other unsaturated hydrocarbons, e.g., copolymers of ethylene and propylene, ethylene and butene-1, and the like.

Broadly speaking, the halogen-containing diluents used in the practice of this invention can be halogenated compounds resulting from the halogenation of aliphatic, cycloaliphatic and aromatic hydrocarbons. Examples of specific halogen-containing diluents include carbon tetrachloride, tetrachloroethane, methylene chloride, chloroform, chlorobenzene, monochlorocyclohexane, and the like.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The amount of the organometal compound present in the catalyst system is preferably at least one percent by weight of the amount of the catalyst component comprising chromium oxide and the additional oxide. While there is no upper limit in the amount of the organo compound which can be employed, the preferred range is from 0.5 to 5 parts by weight per part of the chromium oxide catalyst component. The polymerization of olefins in the presence of the instant catalyst system is carried out at a temperature in the range of zero to 250° F., while the pressure is usually in the range of 10 to 1000 p.s.i.g. Although pressures above 1000 p.s.i.g. can be employed if desired, the preferred pressure range is between 100 and 500 p.s.i.g.

The process of this invention can be carried out as a batch process by pressuring the olefin into a reactor containing the catalyst and halogen-containing diluent. Furthermore, the process can be carried out continuously by maintaining the above-described concentrations of reactants in the reactor for a suitable residence time. The residence time used in a continuous process can vary widely, since it depends to a great extent upon the temperature at which the process is conducted. The residence time also varies with the particular olefin that is being polymerized. However, the residence time generally falls within the range of 1 second to an hour or more. In the batch process, the time for the reaction can also vary widely, such as up to 24 hours or more.

It has been found that various materials in some instances may have a tendency to inactivate the catalyst compositions of this invention. These materials include carbon dioxide, oxygen and water. Therefore, it is usually desirable to free the olefin to be polymerized from these materials, as well as from other materials which may tend to inactivate the catalyst before contacting the olefin with the catalyst. Any of the known means for removing such contaminants can be employed. Furthermore, the diluent should generally be freed of contaminants, such as water, oxygen, and the like. It is desirable, also, that air and moisture be removed from the reaction vessel before the reaction is carried out. However, in some cases small amounts of catalyst inactivating materials, such as oxygen or water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction, when a batch process is used, the reactor is cooled to about room temperature, any excess olefin is vented and the contents of the reactor, including the solid polymer swollen with diluent, is then treated to inactivate the catalyst, as by washing with an alcohol. The alcohol-washing step is preferably carried out in a comminution zone, such as a Waring Blendor, so that a finely-divided polymer is thereby provided. The polymer is then separated from the alcohol and diluent by decantation or filtration and then the polymer is dried. In a preferred method of operation, the polymer while in solution in a diluent is washed with water after which the solution is passed through a filter. The polymer, which is then precipitated from solution e.g., by the addition of a suitable percipitation agent, such as alcohol or water, is recovered by any suitable means, such as filtration or decantation. This method is effective in removing substantially all of the catalyst from the polymer. When the process of the invention is carried out continuously, the total effluent from the reactor, including polymer, diluent and catalyst system is pumped from the reactor as a slurry to a catalyst-inactivating zone where the reactor effluent is cooled and contacted with a suitable catalyst-inactivating material, such as an alcohol, to precipitate the polymer. As in the batch process, it is desirable that the alcohol-treatment step be carried out in a comminution zone so that a finely divided polymer is thereby produced. The diluent and alcohol are then separated from the polymer, for example by filtration and the polymer is then dried. The diluent and alcohol can be separated, for example by fractional distillation, and reused in the process. The polymer can also be subjected to a water-washing step while in solution and then filtered as previously described in order to separate catalyst from the polymer.

A more comprehensive understanding of the invention can be obtained by referring to the following illustrative examples which are not intended, however, to be unduly limitative of the invention.

EXAMPLE I

A silica-alumina composite containing 87 weight percent silica and 13 weight percent alumina was impregnated with chromic nitrate. The resulting catalyst component which contained 2.5 weight percent chromium was activated in an oxidizing atmosphere by heating in air of a dew point less than zero to 1125° F. for 10 hours. The total activation time, i.e., the time from the initial application of heat until cooling, was 24 hours.

Eighteen hundred milliliters of reagent grade carbon tetrachloride, which had been previously dried over silica-alumina, was charged to a 2700 milliliter stainless steel rocking autoclave bomb. Prepurified nitrogen was bubbled through the carbon tetrachloride for 10 minutes, after which 70 grams of the above-described chromium oxide containing catalyst component was charged to the bomb. The bomb was then pressured to 100 p.s.i.g. with pure grade ethylene. For bomb temperature remained constant at 85° F. for 80 minutes during which time no substantial changes in bomb pressure were noted. The bomb pressure was then bled down to 60 p.s.i.g., and the bomb was heated by means of an electrical heater. After a period of 125 minutes, the bomb temperature had reached 205° F., at which temperature the pressure was 110 p.s.i.g. After an additional 215 minutes, the temperature of the bomb was 150° F. and the pressure was 90 p.s.i.g. The heat was then turned off, and the bomb was vented and opened. No solid polymer was present in the bomb.

EXAMPLE II

Eight hundred milliliters of reagent grade carbon tetrachloride, which had been dried over silica-alumina, was charged to the autoclave bomb described in Example I. Prepurified nitrogen was then bubbled through the carbon tetrachloride for 10 minutes, after which 50 ml. of a solution of triisobutylaluminum in cyclohexane, which contained 0.25 gram of triisobutylaluminum per milliliter, was charged to the bomb. The bomb was then pressured to 50 p.s.i.g. with pure grade ethylene, the temperature at this time being 85° F. The bomb was rocked for 5 hours and 45 minutes at this temperature, during which time one repressurization with ethylene was necessary. When the bomb was opened after venting the ethylene, a trace, i.e., an immeasurably small amount, of solid polymer was found.

EXAMPLE III

Eight hundred milliliters of reagent grade carbon tetrachloride which had been dried over activated silica-alumina was charged to the autoclave bomb described in Example I. Prepurified nitrogen was bubbled through the carbon tetrachloride. Twenty grams of the chromium oxide-containing catalyst component of Example I and 40 ml. of a solution of triisobutylaluminum in cyclohexane, which contained 0.25 gram of triisobutylaluminum per milliliter, were charged to the bomb. The bomb was then flushed with nitrogen, closed, and pressured to 100 p.s.i.g. with pure grade ethylene which had been previously dried over activated silica-alumina. The polymerization which was immediately initiated at room temperature was allowed to continue for 4 hours and 30 minutes during which time the temperature gradually increased from an initial value of 85° F. to a maximum of 110° F. and gradually decreased to 105° F. at the end of the run. It was necessary to repressure the bomb to 100 p.s.i.g. with additional ethylene on 12 different occasions during the course of the run. At the end of this time, the pressure was vented from the bomb, after which the bomb was opened. The solid polymer found to be present was washed in methyl alcohol and dried overnight in a vacuum oven at 60° C. (140° F.). One hundred and sixty-five grams of dry polymer were obtained.

The polymer obtained as described above was dissolved in 5 liters of cyclohexane at 300° F. under nitrogen pressure. Thereafter, the solution was charged to a six-gallon stainless steel vessel which was equipped with a stirrer. This solution was then passed through a Cuno filter which was equipped with a glass filter cartridge. The glass filter cartridge had been previously precoated with 60 grams of Celite 512 filter aid. During the filtration, the filter was maintained at 300° F. by means of an electrical heater. After the solution had been filtered, the solvent was flashed off under vacuum, and the polymer which was present was dried overnight at 65° C. (149° F.) under vacuum. One hundred and one grams of dry polymer were obtained. The properties of this dry polymer are set forth hereinbelow in Table I.

*Table I*

| | |
|---|---|
| Density, g./cc. at room temperature | 0.956 |
| Melt index [1] | 0.091 |
| Melting point, ° F. | 250±2 |
| Molecular weight (based on melt index) | 61,000 |
| Impact strength, ft. lbs./in notch [2] | 10.98 |
| Tensile strength (compression molded), p.s.i.[3]: | |
| At break | 3,428 |
| At yield | 3,180 |
| Elongation (compression molded) percent [3] | 13 |

[1] ASTM D1238–52T.
[2] ASTM D256–54T.
[3] ASTM D412–51T.

EXAMPLE IV

A run was carried out following essentially the same procedure described in Example III. In this run, 1600 ml. of reagent grade carbon tetrachloride, which had been previously dried over silica-alumina, was charged to a one-gallon stirred autoclave. After bubbling nitrogen through the carbon tetrachloride, 15 grams of the chromium oxide containing catalyst component, prepared as described in Example I, and 30 ml. of a hydrocarbon solution of triisobutylaluminum, similar to that used in Example III, was charged to the reactor. After flushing with prepurified nitrogen, the autoclave was pressured to 90 p.s.i.g. with pure grade ethylene which had been previously purified by passing through an alkaline pyrogallol solution and overactivated silica-alumina. The polymerization run which was immediately initiated at room temperature was continued for a period of 11 hours, during which time the temperature varied between 75 and 100° F. The major portion of this run was carried out at a temperature of 95° F. As the pressure dropped due to the polymerization, additional ethylene was pressured into the autoclave to raise the reactor pressure to between 110 and 130 p.s.i.g. During this run, it is necessary to add additional ethylene every 10 to 15 minutes. At the end of the 11-hour period, the autoclave was allowed to stand for 10 hours and 35 minutes after which it was noted that the temperature was 65° F. and the pressure was 35 p.s.i.g. The autoclave was then vented and opened, and the polymer contained therein was washed twice in methyl alcohol. After drying this polymer overnight in a vacuum oven at 60° C., 170 grams of dry solid polymer was recovered.

The polymers and copolymers produced in accordance with this invention have utility in applications where solid plastics are used. They can be molded to form articles of any desired shape, such as bottles and containers for liquids. They can also be formed into pipe by extrusion.

From the foregoing, it is seen that the instant invention provides a novel catalyst suitable for use in polymerizing olefins in the presence of a halogen-containing diluent. Many modifications and variations of the invention will be apparent to those skilled in the art upon consideration of the foregoing disclosure. Such modifications and variations are believed to be clearly within the spirit and scope of the invention.

I claim:

1. A method for polymerizing ethylene which comprises contacting ethylene with a catalyst consisting essentially of chromium oxide, at least part of the chromium being in the hexavalent state, supported on silica and alumina and triisobutylaluminum, the amount of triisobutylaluminum in said catalyst being in the range of 0.5 to 5 parts by weight per part of said chromium oxide and said silica and alumina, said contacting occurring in the presence of carbon tetrachloride at a temperature in the range of zero to 250° F. and a pressure in the range of 100 to 500 p.s.i.g.; and recovering the solid polymer of ethylene so produced.

2. A method for polymerizing ethylene which comprises contacting ethylene with a catalyst consisting essentially of (1) chromium oxide, at least part of the chromium being in the hexavalent state, supported on silica and alumina, and (2) a compound having the formula $AlR_3$, wherein R is an alkyl radical having up to 20 carbon atoms, the amount of the $AlR_3$ compound in said catalyst being in the range of 0.5 to 5 parts by weight per part of said chromium oxide and said silica and alumina, said contacting occurring in the presence of carbon tetrachloride at a temperature in the range of zero to 250° F. and a pressure in the range of 100 to 500 p.s.i.g.

3. A method according to claim 1 wherein said $AlR_3$ compound is triethylaluminum.

References Cited in the file of this patent

UNITED STATES PATENTS 2,824,089 Peters et al. _____ Feb. 18, 1958

FOREIGN PATENTS 534,792 Belgium _____ Jan. 31, 1955

UNITED STATES PATENT OFFICE

CERTIFICATE OF CORRECTION

Patent No. 2,944,049                                  July 5, 1960

James T. Edmonds, Jr.

It is hereby certified that error appears in the printed specification of the above numbered patent requiring correction and that the said Letters Patent should read as corrected below.

Column 8, line 28, for the claim reference numeral "1" read -- 2 --.

Signed and sealed this 31st day of January 1961.

(SEAL)
Attest:

KARL H. AXLINE                                ROBERT C. WATSON
Attesting Officer                             Commissioner of Patents